United States Patent
LaComb et al.

(10) Patent No.: US 8,479,583 B1
(45) Date of Patent: Jul. 9, 2013

(54) QUASI-STATIC BEND SENSOR USING ELECTRO-ACTIVE MATERIALS

(75) Inventors: Julie LaComb, West Greenwich, RI (US); Ronald LaComb, West Greenwich, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 245 days.

(21) Appl. No.: 13/135,326

(22) Filed: Jun. 9, 2011

(51) Int. Cl.
G01B 7/16 (2006.01)
G01B 5/30 (2006.01)
G01F 25/00 (2006.01)
G01L 1/00 (2006.01)

(52) U.S. Cl.
USPC .............................................. 73/763; 73/760

(58) Field of Classification Search
USPC ................................................... 73/763, 760
See application file for complete search history.

(56) References Cited

U.S. PATENT DOCUMENTS

| | | | |
|---|---|---|---|
| 5,225,126 A * | 7/1993 | Alles et al. | 264/620 |
| 6,655,218 B1 * | 12/2003 | Ogisu et al. | 73/768 |
| 6,986,286 B2 * | 1/2006 | Ogisu et al. | 73/772 |
| 7,635,984 B2 * | 12/2009 | Stanley et al. | 324/686 |
| 7,982,375 B2 * | 7/2011 | Tan et al. | 310/338 |
| 8,132,468 B2 * | 3/2012 | Radivojevic | 73/777 |
| 2008/0051704 A1 * | 2/2008 | Patel et al. | 604/95.05 |
| 2009/0078257 A1 * | 3/2009 | Bhat et al. | 128/204.23 |
| 2010/0271755 A1 * | 10/2010 | Kaminska et al. | 361/323 |

* cited by examiner

*Primary Examiner* — Lisa Caputo
*Assistant Examiner* — Jamel Williams
(74) *Attorney, Agent, or Firm* — James M. Kasischke; Jean-Paul A. Nasser; Michael P. Stanley

(57) ABSTRACT

A quasi-static bend sensor is taught that comprises a layering of a plurality of ionic polymer metal composite (IPMC) sections with intervening dielectric sections in a vertical stack configuration. The IPMC sections are electrically connected in parallel. The surface of the stack is coated with high-purity synthetic isoparaffins for polymer hydration to increase step response consistency. Finally, the vertical stack configuration is electrically connected to an electric field measurement device and a linear quadratic regulator based controller for reducing settling time.

4 Claims, 1 Drawing Sheet

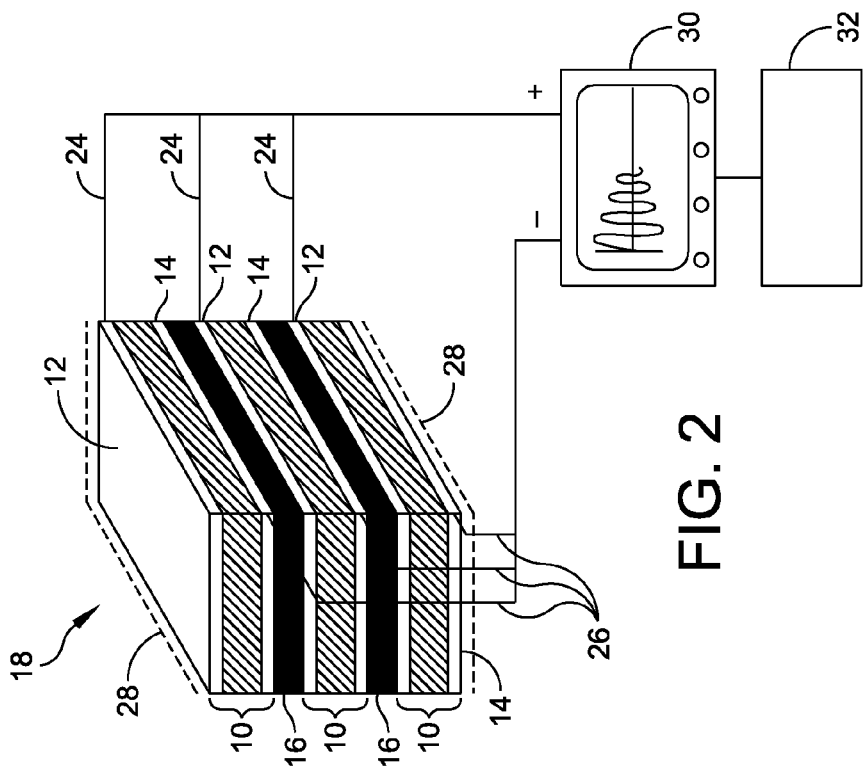
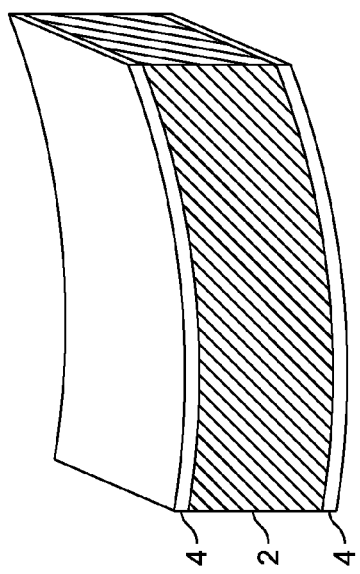
FIG. 1a
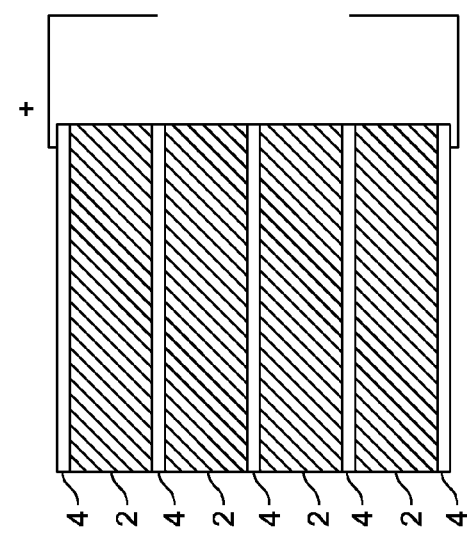
FIG. 1b
FIG. 2

US 8,479,583 B1

QUASI-STATIC BEND SENSOR USING ELECTRO-ACTIVE MATERIALS

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER RELATED APPLICATIONS

Not applicable.

BACKGROUND OF THE INVENTION (1) Field of the Invention

The present invention relates to electro-active materials, and more specifically to devices composed of ionic polymer metal composites (IPMC) for use as bend sensors or velocity sensors.

(2) Description of the Prior Art

Electro-active materials are subject to mechanical deformation in response to external electrical stimulation or of electric current generation in response to externally induced strain. Electro-active materials are most often used as energy harvesting devices, active noise cancellation, vibration control, microphones and acoustic transducers. Electro-active polymers are also being studied for their use in artificial muscles. Recent advances and characterization of electro-active material bend sensors have exhibited a correlation between charge flow and rate of motion of the material, with relatively constant sensitivities over the frequency ranges from 0.1-20 Hz.

IPMCs are active materials that exhibit electro-mechanical coupling and consist of an ionic polymer membrane 2 with ion exchange capability (such as Nation® or Flemion®) whose planar surfaces are coated with conductors 4 such as platinum or gold, as illustrated in FIG. 1a. IPMCs have been investigated for use as actuators and motion sensors and have exhibited similar properties to piezoelectric materials. Under an applied voltage (1-5V), ion migration and electrostatic repulsion result in bending actuation. Under an applied dynamic deformation IPMC material generates a dynamic electric field with a voltage proportional to the applied force causing the deformation and with voltage polarity representative of the deflection direction. IPMC bending transducers or sensors have demonstrated relatively constant sensitivities on the order 30 µm (deflection)/mm (polymer length) over the frequency range from 0.1-20 Hz. Stacking IPMC materials as illustrated in FIG. 1b (also referred to as morphing) can increase the sensitivity of IPMC bending transducers.

One drawback of current IPMC bend sensors is that their settling time associated with a step input is on the order of 5-20 seconds for devices (on the order of 40 mm long) and increases with length. Another disadvantage of sensors and actuators fabricated with IPMCs is their inconsistent and non-repeatable step responses. Step response inconsistencies are attributable to polymer stiffness, which is a function of surface hydration. Another disadvantage of IPMC bend sensors is their limited sensitivity to deflection when compared to bend sensors of other electro-active material.

For this reason, what is needed is an IPMC bend sensor with a more consistent step response and greater sensitivity.

SUMMARY OF THE INVENTION

It is a general purpose and object of the present invention to provide an IPMC bend sensor with a more consistent step response than prior art bend sensors.

It is a further object of the present invention to provide an IPMC bend sensor with greater sensitivity than prior art bend sensors.

These objects are accomplished by layering a plurality of IPMC sections with intervening dielectric sections in a vertical stack configuration and electrically connecting the positive and negative electrodes of each IPMC section in parallel. The surface of the stack is coated with high-purity synthetic isoparaffins for polymer hydration to increase step response consistency. Finally, the vertical stack configuration is connected to an electric field measurement device and a linear quadratic regulator based controller for reducing settling time.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1a is an illustration of the constituent parts of ionic polymer metal composites;

FIG. 1b is an illustration of a morphing configuration of ionic polymer metal composites; and FIG. 2 is an illustration of the components of the quasi-static bend sensor of the present invention.

DETAILED DESCRIPTION OF THE INVENTION

Referring now to FIG. 2 there is illustrated several Ionic Polymer Metal Composite (IPMC) sections 10 each section having a top conductive surface 12 and a bottom conductive surface 14. There is also illustrated multiple dielectric sections 16. In a preferred embodiment, the dielectric section 16 is made of a thin flexible light weight material. An example of dielectric section 16 is electrical insulating adhesive tape.

The IPMC sections 10 are stacked vertically in a modified morphing arrangement with a dielectric section 16 between the top conductive surface 12 of an IPMC section 10 below it and the bottom conductive surface 14 of an IPMC section 10 above it to prevent electrical conduction between the two surfaces. This modified morphing arrangement creates a multilayer configuration 18 of IPMC sections 10 and dielectric sections 16.

Each of the top conductive surfaces 12 of each IPMC section 10 serves as a positive electrode in the multilayer configuration 18. Each of the bottom conductive surfaces 14 of each IPMC section 10 serves as a negative electrode in the multilayer configuration 18. In an alternative embodiment each of the top conductive surfaces 12 of each IPMC section 10 serves as a negative electrode in the multilayer configuration 18, and each of the bottom conductive surfaces 14 of each IPMC section 10 serves as a positive electrode in the multilayer configuration 18.

All of the positive electrodes are attached to individual wire leads 24 connecting all of the positive electrodes together. All of the negative electrodes are attached to individual wire leads 26 connecting all of the negative electrodes together. This type of wiring scheme essentially wires the stacked multiple IPMC sections 10 in parallel. The surface of the multilayer configuration 18 is coated with high-purity synthetic isoparaffin 28 (such as Isopar™) for polymer hydration to increase step response consistency. In an alternative embodiment, the surface of the multilayer configuration 18 is coated with silicone.

The IPMC sections 10 exhibit sensitivity to deflections. The sensitivity is manifested in an induced dynamic electric field that is generated by the IPMC sections 10 and can be measured via the positive electrodes and negative electrodes being connected via wire leads 24 and 26 to an appropriate electric field measurement device 30 and a linear quadratic regulator based controller 32 for feedback control to reduce settling time.

The advantage of the present invention over the prior art is that the prior art does not teach using IPMC sections as bend sensors due to the very small magnitude of the sensing signal compared to the actuation signal. The present invention solves the magnitude of the sensing signal problem by electrically connecting IPMC stacks in parallel to increase the sensitivity of the IPMC sections 10. The prior art does not specify the characteristics and ability of IPMC sections as "soft" sensors because the operational mechanism of IPMC sections are not clear. As such there is no prior art teaching or suggestion to electrically connect IPMC stacks in parallel. The multilayer configuration 18 of the present invention, electrically connected in parallel, dramatically increases the sensitivity of the IPMC sections 10 to deflections. This is analogous to adding capacitors in parallel to increase the overall capacitance of a circuit.

In light of the above, it is therefore understood that within the scope of the appended claims, the invention may be practiced otherwise than as specifically described.

What is claimed is:

1. A bend sensor, comprising:
a plurality of ionic polymer metal composite sections each section having a top conductive surface and a bottom conductive surface, wherein all of the sections are of the same dimensions;
a plurality of dielectric sections made of a thin flexible light weight dielectric material, wherein all of the sections are of the same dimensions as the plurality of ionic polymer metal composite sections, wherein the plurality of ionic polymer metal composite sections are stacked vertically with a single dielectric section between each individual ionic polymer metal composite section, such that none of the top conductive surfaces of the plurality of ionic polymer metal composite sections is in electrical contact with any of the bottom conductive surface of the plurality of ionic polymer metal composite sections;
a first plurality of conducting wire leads that join at one end to a single wire, wherein a single conducting wire lead of each first plurality of conducting wire leads is joined to each of the top conductive surfaces of the plurality of ionic polymer metal composite sections thereby electrically connecting all of the top conductive surfaces of the plurality of ionic polymer metal composite sections together in parallel;
a second plurality of conducting wire leads that join at one end to a single wire, wherein a single conducting wire lead of each second plurality of conducting wire leads is joined to each of the bottom conductive surfaces of the plurality of ionic polymer metal composite sections thereby electrically connecting all of the bottom conductive surfaces of the plurality of ionic polymer metal composite sections together in parallel;
a coating of high-purity synthetic isoparaffin disposed over the surface of the stack of the plurality of ionic polymer metal composite and dielectric sections to maintain polymer hydration;
an electric field measurement device electrically joined to the plurality of ionic polymer metal composite sections through the first plurality of conducting wire leads and the second plurality of conducting wire leads; and
a linear quadratic regulator based controller joined to said electric field measurement device.

2. A method for fabricating a bend sensor comprising the steps of:
providing a plurality of ionic polymer metal composite sections each section having a top conductive surface and a bottom conductive surface, wherein all of the plurality of ionic polymer metal composite sections are of the same dimensions;
providing a plurality of dielectric sections made of a thin flexible light weight dielectric material, wherein all of the dielectric sections are of the same dimensions as the plurality of ionic polymer metal composite sections;
stacking the plurality of ionic polymer metal composite sections vertically with a single dielectric section between each individual ionic polymer metal composite section, such that none of the top conductive surfaces of the plurality of ionic polymer metal composite sections is in electrical contact with any of the bottom conductive surface of the plurality of ionic polymer metal composite sections;
connecting each of the top conductive surfaces of the plurality of ionic polymer metal composite sections together electrically in parallel;
connecting each of the bottom conductive surfaces of the plurality of ionic polymer metal composite sections together electrically in parallel;
disposing a coating of high-purity synthetic isoparaffin over the surface of the stack of the plurality of ionic polymer metal composite and dielectric sections to maintain polymer hydration;
connecting an electric field measurement device electrically to the plurality of ionic polymer metal composite sections through the first plurality of conducting wire leads and the second plurality of conducting wire leads; and
connecting a linear quadratic regulator based controller electrically to said electric field measurement device.

3. The method of claim 2 wherein connecting each of the top conductive surfaces of the plurality of ionic polymer metal composite sections together electrically in parallel comprises:
providing a first plurality of conducting wire leads; and
joining a single conducting wire lead from said first plurality of conducting wire leads to each of the top conductive surfaces of the plurality of ionic polymer metal composite sections.

4. The method of claim 2 wherein connecting each of the bottom conductive surfaces of the plurality of ionic polymer metal composite sections together electrically in parallel comprises:
providing a second plurality of conducting wire leads; and
joining a single conducting wire lead from said second plurality of conducting wire leads to each of the bottom conductive surfaces of the plurality of ionic polymer metal composite sections.

* * * * *